(12) United States Patent
Iwamoto (10) Patent No.: US 10,124,853 B2
(45) Date of Patent: Nov. 13, 2018

(54) STRADDLE-TYPE VEHICLE

(71) Applicant: Kawasaki Jukogyo Kabushiki Kaisha, Kobe-shi, Hyogo (JP)

(72) Inventor: Taro Iwamoto, Kakogawa (JP)

(73) Assignee: KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 0 days.

(21) Appl. No.: 15/454,925

(22) Filed: Mar. 9, 2017

(65) Prior Publication Data

US 2017/0259872 A1    Sep. 14, 2017

(30) Foreign Application Priority Data

Mar. 10, 2016   (JP) .................. 2016-046475

(51) Int. Cl.
| | |
|---|---|
| B62K 19/40 | (2006.01) |
| B62J 6/02 | (2006.01) |
| B62J 17/00 | (2006.01) |
| B62J 99/00 | (2009.01) |
| B62K 11/04 | (2006.01) |
| B62M 7/02 | (2006.01) |
| B62L 3/08 | (2006.01) |

(52) U.S. Cl.
CPC .............. *B62K 19/40* (2013.01); *B62J 6/02* (2013.01); *B62J 17/00* (2013.01); *B62J 99/00* (2013.01); *B62K 11/04* (2013.01); *B62M 7/02* (2013.01); *B62J 2099/002* (2013.01); *B62J 2099/004* (2013.01); *B62K 2207/00* (2013.01); *B62L 3/08* (2013.01)

(58) Field of Classification Search
CPC ................ B62K 19/40; B62K 2207/00; B62K 2207/02; B62K 2207/04
See application file for complete search history.

(56) References Cited

U.S. PATENT DOCUMENTS

| | | | |
|---|---|---|---|
| 2016/0176467 A1* | 6/2016 | Ishii | ......................... B62J 17/02 180/219 |
| 2017/0088210 A1* | 3/2017 | Azuma | .................... B62J 35/00 |

FOREIGN PATENT DOCUMENTS

| | | | | |
|---|---|---|---|---|
| EP | 2990317 A1 | * | 3/2016 | ............. B62J 27/00 |
| JP | 2010228676 A | * | 10/2010 | |
| JP | 5319357 B2 | | 10/2013 | |
| JP | 2014201173 A | * | 10/2014 | |

\* cited by examiner

*Primary Examiner* — Kevin Hurley
(74) *Attorney, Agent, or Firm* — Alleman Hall Creasman & Tuttle LLP (57) ABSTRACT

A straddle-type vehicle comprises a vehicle body frame; a heavy weight vehicle member mounted on a vehicle body; a support member fastened to the vehicle body frame to support the heavy weight vehicle member; and a vehicle body behavior sensor which detects a behavior of the vehicle body, and the vehicle body behavior sensor is mounted on the support member.

8 Claims, 7 Drawing Sheets

STRADDLE-TYPE VEHICLE

CROSS-REFERENCE TO THE RELATED APPLICATION

This application claims priority to and the benefit of Japanese Patent Application No. 2016-046475, filed on Mar. 10, 2016, the entire disclosure of which is incorporated herein by reference.

BACKGROUND OF THE INVENTION

Field of the Invention

The present invention relates to a straddle-type vehicle. In particular, the present invention relates to a straddle-type vehicle including a vehicle body behavior sensor.

Description of the Related Art

For example, Japanese Patent No. 5319357 discloses a straddle-type vehicle such as a motorcycle which includes a vehicle body behavior sensor mounted on a vehicle body to detect a vehicle body behavior while the vehicle is traveling.

In some cases, depending on a location at which the vehicle body behavior sensor is mounted on the vehicle body, a vibration generated in a region that is in the vicinity of the vehicle body behavior sensor, in particular, a vibration of a high frequency (radio frequency) wave, is transmitted to the vehicle body behavior sensor, and thereby the vehicle body behavior sensor cannot output a detection signal with a high accuracy. Under the circumstances, the vehicle body behavior sensor is required to output a detection signal with a high accuracy.

SUMMARY OF THE INVENTION

In view of the above-described circumstances, an object of the present invention is to improve the accuracy of the detection signal output from the vehicle body behavior sensor.

According to an aspect of the present invention, a straddle-type vehicle comprises a vehicle body frame; a heavy weight vehicle member mounted on a vehicle body; a support member fastened to the vehicle body frame to support the heavy weight vehicle member; and a vehicle body behavior sensor which detects a behavior of the vehicle body, wherein the vehicle body behavior sensor is mounted on the support member.

In accordance with this configuration, since the support member on which the vehicle body behavior sensor is mounted supports the heavy weight vehicle member, it becomes possible to prevent the vehicle body behavior sensor from vibrating at a high frequency (radio frequency) wave, and thereby improve the accuracy of a detection signal output from the vehicle body behavior sensor.

In the straddle-type vehicle, the heavy weight vehicle member may be a head lamp unit disposed in front of a head pipe of the vehicle body frame, the support member may be fastened to the head pipe to support the head lamp unit, and the vehicle body behavior sensor may be mounted on a portion of the support member which is between the head lamp unit and the head pipe.

In accordance with this configuration, since the vehicle body behavior sensor is mounted on the support member supporting the head lamp unit as the heavy weight vehicle member, it becomes possible to prevent the vehicle body behavior sensor from vibrating at a high frequency wave, and thereby improve the accuracy of the detection signal output from the vehicle body behavior sensor. Since the vehicle body behavior sensor is mounted on the support member which is the existing member included in the vehicle to support the head lamp unit, the vehicle body behavior sensor can be mounted on the vehicle body without increasing the number of members. Since the vehicle body behavior sensor is mounted on a portion of the support member which is between the head lamp unit and the head pipe, the length of the support member in the forward and rearward direction is not increased, and the size of the support member is not increased, in the configuration for mounting the vehicle body behavior sensor.

The straddle-type vehicle may further comprise a front cowling covering a front portion of the vehicle body, and the support member may support the front cowling.

In accordance with this configuration, since the support member further supports the front cowling with a heavy weight in addition to the heavy weight vehicle member, it becomes possible to more effectively prevent the vehicle body behavior sensor from vibrating at a high frequency wave, and thereby further improve the accuracy of the detection signal output from the vehicle body behavior sensor.

The straddle-type vehicle may further comprise a meter device disposed in front of the head pipe, and the support member may support the meter device.

In accordance with this configuration, since the support member on which the vehicle body behavior sensor is mounted further supports the meter device which is the existing member included in the straddle-type vehicle, meter harness connected to the meter device and sensor harness connected to the vehicle body behavior sensor are disposed to be close to each other, and the sensor harness and the meter harness positioned in a predetermined manner can be easily laid out compactly as a bundle.

In the straddle-type vehicle, the vehicle body behavior sensor may overlap with the head pipe in a forward and rearward direction of the vehicle body.

In accordance with this configuration, the vehicle body behavior sensor can be disposed at a location that is in the vicinity of a vehicle body center line extending through the head pipe and in the forward and rearward direction, namely, near the center of the vehicle body in the vehicle width direction. In this layout, the vehicle body behavior sensor can obtain a detection signal which is close to a signal indicating a vehicle body behavior at a center location of the vehicle body. As a result, the accuracy of the detection signal output from the vehicle body behavior sensor can be easily improved.

The straddle-type vehicle may further comprise a first fastener member used to fasten the support member to the vehicle body frame; and a second fastener member used to mount the vehicle body behavior sensor on the support member, a fastening direction of the second fastener member may be the same as a fastening direction of the first fastener member, and the fastening direction of the first fastener member and the fastening direction of the second fastener member may conform to a vehicle width direction.

In accordance with this configuration, since the vehicle body behavior sensor is mounted on the support member in the vehicle width direction, the vehicle body behavior sensor can be easily mounted in a manufacture line of the straddle-type vehicle. Since the fastening direction of the second fastener member used to mount the vehicle body behavior sensor on the support member is the same as that of the first fastener member used to fasten the support member to the vehicle body frame, mounting of the vehicle body behavior sensor and fastening of the support member can be carried out in the same direction, and the vehicle body behavior sensor can be easily mounted on the support member. Since the vehicle body behavior sensor can be easily mounted on the support member, accuracy with which the vehicle body behavior sensor is mounted on the support member can be improved.

In the straddle-type vehicle, the vehicle body frame may include a front frame and a rear frame extending rearward from a rear end of the front frame, the rear frame may support a seat which is straddled by a rider, the heavy weight vehicle member may be a battery disposed in a space formed below the seat, and the support member may be fastened to the rear frame to support the battery.

In accordance with this configuration, since the vehicle body behavior sensor is mounted on the support member supporting the battery as the heavy weight vehicle member, it becomes possible prevent the vehicle body behavior sensor mounted on the support member from vibrating at a high frequency wave, and improve the accuracy of the detection signal output from the vehicle body behavior sensor. In addition, since the vehicle body behavior sensor is mounted on the support member supporting the battery disposed in the space formed below the seat, it becomes possible to prevent the vehicle body behavior sensor from being exposed to water.

The straddle-type vehicle may further comprise an engine including a crankshaft extending in a vehicle width direction, the vehicle body behavior sensor may be mounted on a surface of the support member, the surface being perpendicular to the vehicle width direction.

In the straddle-type vehicle including the engine including the crankshaft extending in the vehicle width direction, a vibration having a component in the forward and rearward direction, which is caused by the rotational motion of the crankshaft, and the rotational motion of a connecting rod, and a vibration caused by the vertical motion of the piston and the vertical motion of the connecting rod, tend to be generated. In other words, a vibration in the direction perpendicular to the vehicle width direction tends to be generated. In accordance with the above-described configuration, since the vehicle body behavior sensor is mounted on the surface of the support member, the surface being perpendicular to the vehicle width direction, the vehicle body behavior sensor is less affected by the vibration in the direction perpendicular to the vehicle width direction, which tends to be generated in the straddle-type vehicle. Therefore, the effects of the vibration on the vehicle body behavior sensor can be reduced, and the accuracy of the detection signal output from the vehicle body behavior sensor can be further improved.

In the straddle-type vehicle, the support member may include a pair of mounting plate sections, and a coupling plate section coupling the pair of mounting plate sections to each other in a vehicle width direction, and the vehicle body behavior sensor may be mounted on at least one of the pair of mounting plate sections.

In accordance with this configuration, since the pair of mounting plate sections are coupled to each other in the vehicle width direction by the coupling plate section, the strength of the support member in the vehicle width direction can be secured, and the vehicle body behavior sensor is less affected by the vibration in the vehicle width direction. Therefore, the effects of the vibration on the vehicle body behavior sensor can be reduced, and the accuracy of the detection signal output from the vehicle body behavior sensor can be further improved.

The above and further objects, features and advantages of the present invention will more fully be apparent from the following detailed description of preferred embodiment with accompanying drawings.

DETAILED DESCRIPTION OF THE EMBODIMENTS

Hereinafter, the embodiments of the present invention will be described with reference to the drawings. Throughout the drawings, the same or corresponding constituents are designated by the same reference symbols, and will not be described in repetition. The directions stated below are from the perspective of a rider straddling a straddle-type vehicle. A vehicle length direction corresponds to a forward and rearward direction, and a vehicle width direction corresponds to a rightward and leftward direction.

Embodiment 1

Figure 1:
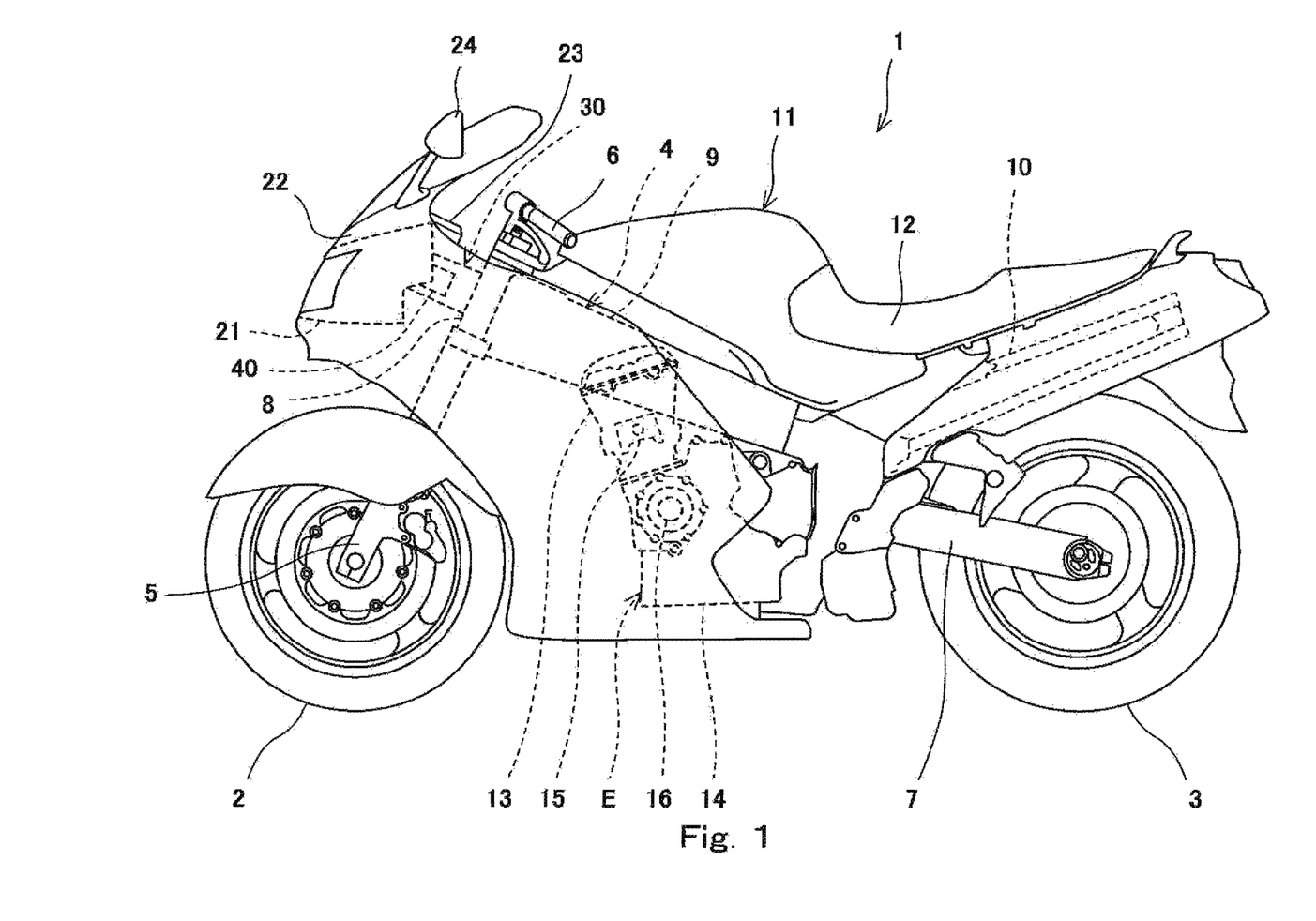
FIG. 1 is a left side view of a motorcycle which is an example of a straddle-type vehicle according to Embodiment 1.

FIG. 1 is a left side view of a motorcycle 1 which is an example of a straddle-type vehicle according to Embodiment 1. The motorcycle 1 includes a front wheel 2, a rear wheel 3, and a vehicle body frame 4 disposed between the front wheel 2 and the rear wheel 3. The front wheel 2 is rotatably connected to the lower end portion of a front fork 5 extending substantially vertically. A handle 6 extends in the rightward and leftward direction, and is attached to the upper end portion of the front fork 5 via a steering shaft (not shown). The rear wheel 3 is supported on the vehicle body frame 4 via a swing arm 7. The vehicle body frame 4 includes a head pipe 8, a front frame 9 extending rearward from the head pipe 8, and a pair of right and left rear frames 10 extending rearward from the rear end of the front frame 9. An engine E is disposed below the front frame 9, and is supported on the front frame 9. A seat 12 which can be straddled by the rider is supported on the rear frames 10.

The engine E includes a cylinder block 13, and a crankcase 14 connected to the lower end portion of the cylinder block 13. The cylinder block 13 is tilted in a forward direction. A piston 15 is accommodated in the cylinder block 13 in such a manner that the piston 15 is vertically reciprocatable. A crankshaft 16 extending in the vehicle width direction is rotatably accommodated in the crankcase 14.

The piston 15 is connected to the crankshaft 16 via a connecting rod (not shown). This allows the reciprocating motion of the piston 15 to be converted onto the rotational motion of the crankshaft 16. At this time, the connecting rod performs a vertical reciprocating motion and a rotational motion. In the present embodiment, the engine E is an in-line multi-cylinder engine including a plurality of pistons 15 arranged in the vehicle width direction. In the motorcycle 1 including the in-line multi-cylinder engine E, a vibration having a component in the forward and rearward direction, which is caused by the reciprocating motion of the piston 15, the rotational motion of the crankshaft 16, and the rotational motion of the connecting rod, and a vibration having a vertical component which is caused by the reciprocating motion of the piston and the reciprocating motion of the connecting rod, tend to be generated. Note that the engine E may be a single-cylinder engine or a V-type engine.

A head lamp unit 21, a front cowling 22, a meter device 23, and side mirrors 24 are disposed in front of the head pipe 8. The head lamp unit 21, the front cowling 22, the meter device 23, and the side mirrors 24 are heavy weight vehicle members which are heavier in weight than a vehicle body behavior sensor 40, among vehicle members included in the motorcycle 1. The head lamp unit 21, the front cowling 22, the meter device 23, and the side mirrors 24 are supported by a support member 30. The support member 30 is made of a metal such as aluminum alloy and secured to the head pipe 8. Although in the present embodiment, the support member 30 supports the plurality of heavy weight vehicle members, this is merely exemplary. It is sufficient that the support member 30 supports at least one heavy weight vehicle member. The vehicle body behavior sensor 40 is mounted on the support member 30.

The vehicle body behavior sensor 40 is a sensor which detects the vehicle body behavior of the motorcycle 1 (the motion of a vehicle body 11). The vehicle body behavior sensor 40 detects a physical motion at a portion (a sensor mounting location) of the vehicle body 11 on which the vehicle body behavior sensor 40 is mounted. Examples of the physical motion includes a n-times temporal differentiation (n: natural number) of an angular change around at least one of three axes which are a roll axis (front and rear axis) of the vehicle body 11, a yawing axis (vertical axis) of the vehicle body 11, and a pitching axis (right and left axis) of the vehicle body 11. In the present embodiment, the vehicle body behavior sensor 40 is a gyro sensor which is an example of an angular velocity sensor.

Figure 2:
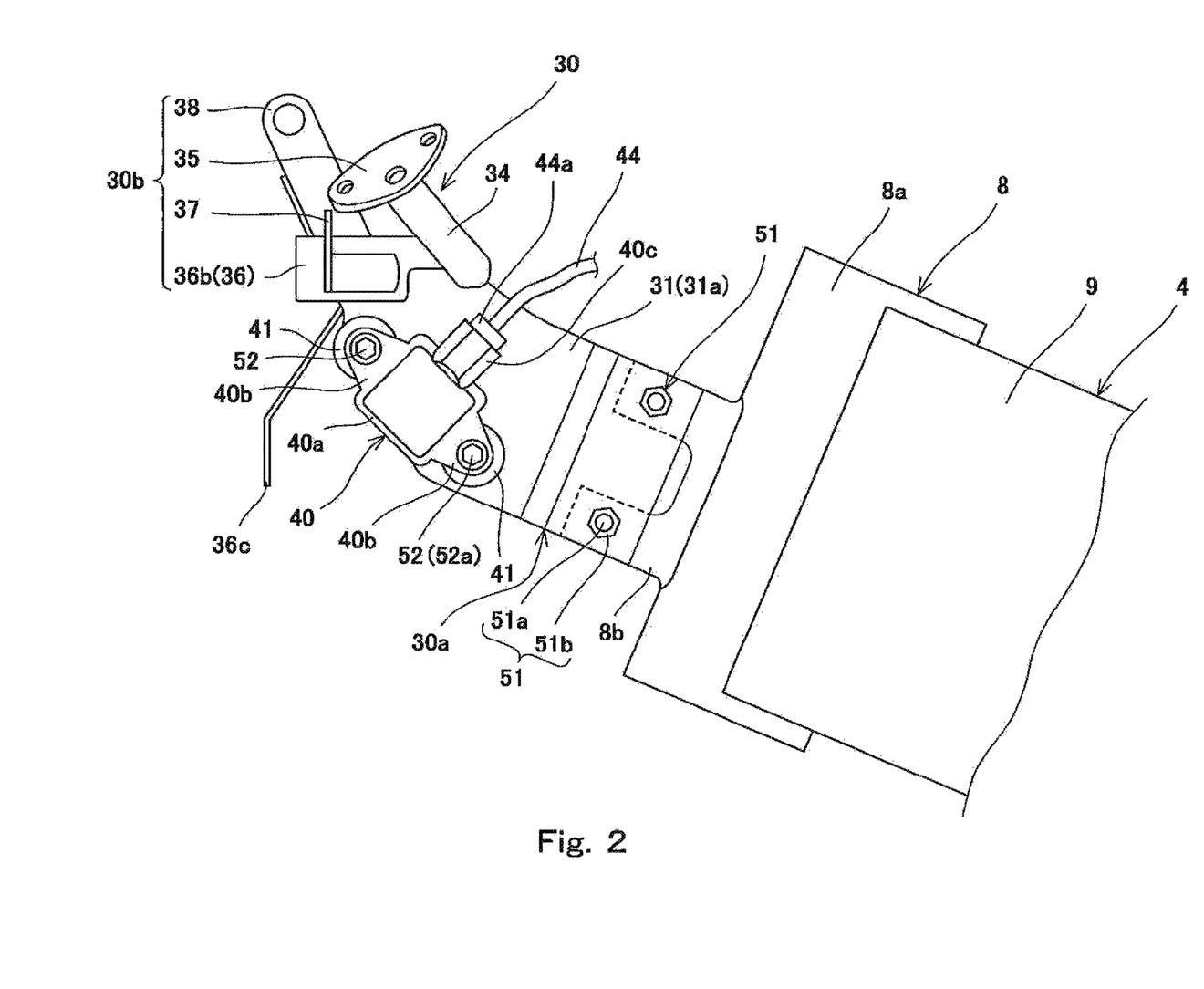
FIG. 2 is a side view showing a region which is in the vicinity of a support member of FIG. 1, when viewed from the left in a vehicle with direction of the motorcycle.
Figure 3:
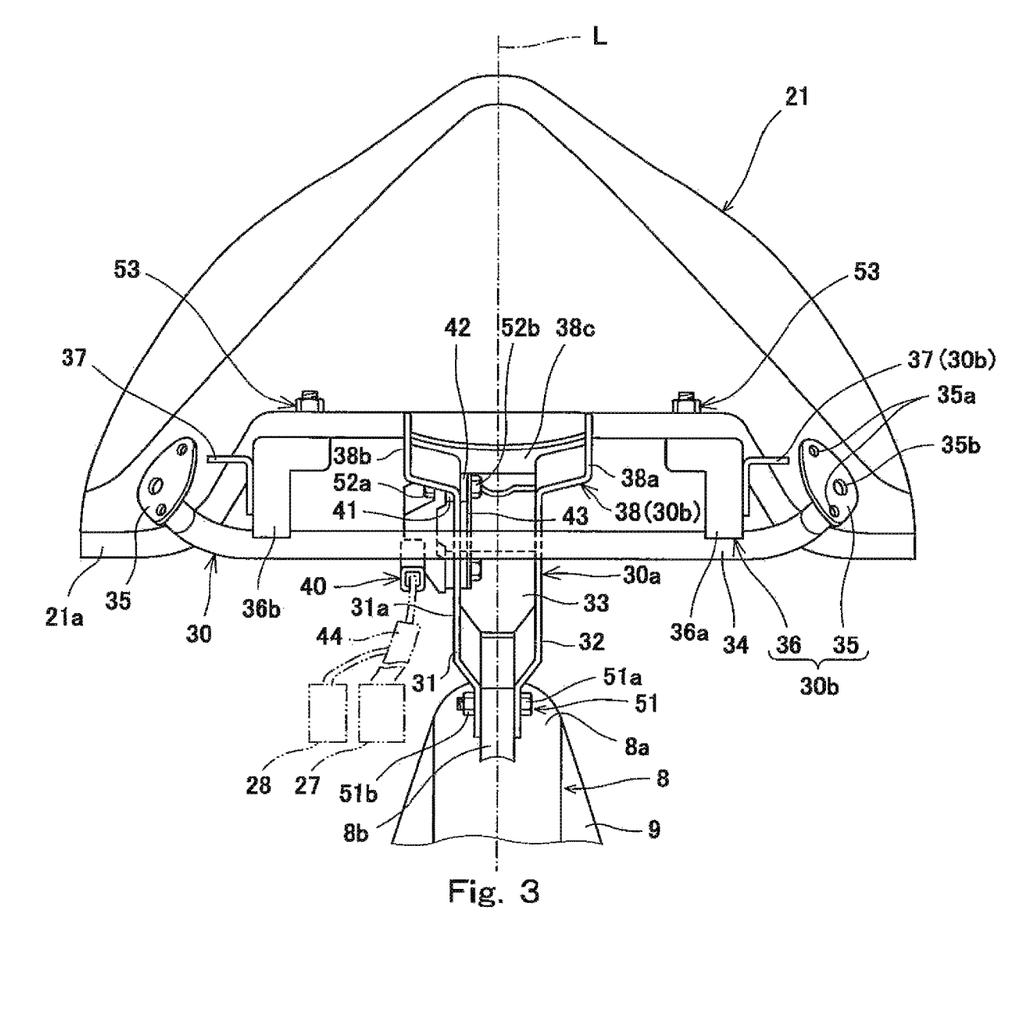
FIG. 3 is a plan view showing a region which is in the vicinity of the support member of FIG. 2, in a state in which a head lamp unit is mounted on the support member of FIG. 2.
Figure 4:
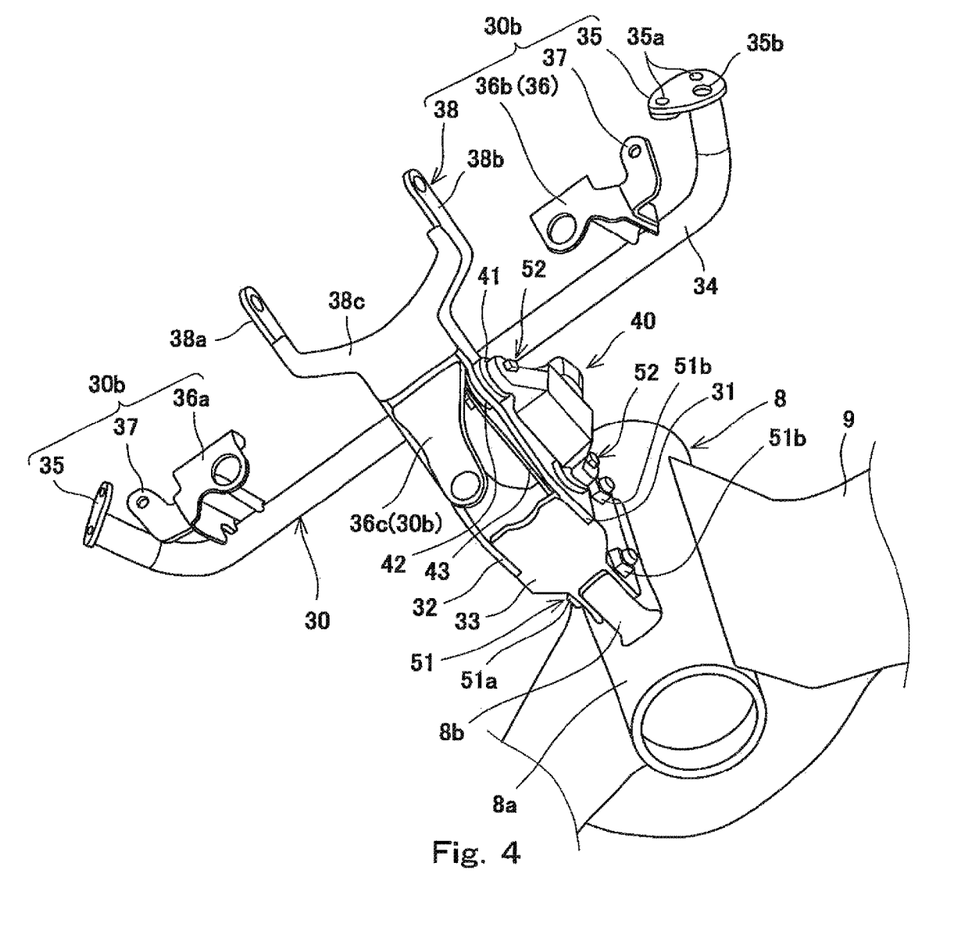
FIG. 4 is a perspective view showing a region which is in the vicinity of the support member of FIG. 2, when viewed obliquely from the left and below.

FIG. 2 is a side view showing a region which is in the vicinity of the support member 30 of FIG. 1, when viewed from the left in the vehicle with direction. FIG. 3 is a plan view showing a region which is in the vicinity of the support member 30 of FIG. 2, in a state in which the head lamp unit 21 is mounted on the support member 30. FIG. 4 is a perspective view showing a region which is in the vicinity of the support member 30 of FIG. 2, when viewed obliquely from the left and below. As shown in FIGS. 2 to 4, the head pipe 8 includes a body section 8a of a substantially cylindrical shape, and a fastening section 8b which is integrated with the body section 8a and to which the support member 30 is fastened. The body section 8a extends substantially vertically, at the front portion of the vehicle body frame 4. When viewed from the side, the fastening section 8b protrudes forward from the body section 8a in such a manner that the fastening section 8b is tilted in an upward direction with respect to a horizontal line. Alternatively, the fastening section 8b may be separate from the body section 8a and joined to the body section 8a by welding.

The gyro sensor 40 is configured to detect angular velocities around at least two axes and an acceleration rate in at least one axis direction, to measure the posture of the vehicle body 11, in a roll direction, a yawing direction, and a pitching direction. Alternatively, the gyro sensor 40 may detect only the angular velocities.

The gyro sensor 40 includes a sensor body section 40a, a pair of flange sections 40b, and a connector connection section 40c. The sensor body section 40a has a substantially rectangular parallelepiped shape. The sensor body section 40a accommodates therein a circuit board on which an oscillation element, an IC, and the like are mounted. The pair of flange sections 40b protrude from the both sides in the forward and rearward direction, of the sensor body section 40a. Each of the pair of flange sections 40b has an insertion hole into which a bolt 52a is inserted. A connector 44a of sensor harness 44 is connected to the connector connection section 40c. In a state in which the gyro sensor 40 is mounted on the support member 30, the pair of flange sections 40b are tilted vertically with respect to a horizontal line extending in the forward and rearward direction. The connector connection section 40c protrudes from the upper portion of the sensor body section 40a, obliquely in a rearward direction and an upward direction. In this configuration, the sensor harness 44 connected to the connector connection section 40c also extends obliquely in a rearward direction and an upward direction.

The motorcycle 1 includes a brake controller 27 having at least one of an anti-lock brake system (ABS) function, and a combined brake system (CBS) function. The gyro sensor 40 is connected to the brake controller 27. For example, the brake controller 27 may set a proper hydraulic pressure of a brake with respect to a wheel, based on the posture of the vehicle body 11 (vehicle body posture) measured based on the angular velocity or the acceleration rate detected by the gyro sensor 40.

The gyro sensor 40 is also connected to an engine controller 28. The engine controller 28 is configured to control an engine output by controlling an ignition timing of the engine E, an ignition reduction of the engine E, the amount of intake-air to be supplied to the engine E, a fuel injection amount of an injector, etc., based on the vehicle body posture measured based on the angular velocity or the acceleration rate detected by the gyro sensor 40.

Further, the gyro sensor 40 may be connected to another actuator controller mounted on the vehicle body 11, instead of the brake controller 27 and the engine controller 28. For example, the gyro sensor 40 may be connected to an adaptive front-lighting system (AFS) controller. The AFS controller may perform a control for changing the irradiation region of the head lamp unit 21 or a control for turning on an auxiliary lamp provided on the vehicle body 11 separately from the head lamp unit 21, based on the vehicle body posture or the like measured based on the angular velocity or the acceleration rate detected by the gyro sensor 40, to ensure that the rider can well see a road surface while the motorcycle 1 is turning. Further, data output from the gyro sensor 40 may be pre-stored in a memory, and used to improve the rider's operation for driving.

The support member 30 includes a sensor mounting unit 30a on which the gyro sensor 40 is mounted, and a heavy weight vehicle member support unit 30b supporting the heavy weight vehicle members 21 to 24 mounted on the vehicle body 11. The base end portion of the sensor mounting unit 30a is fastened to the head pipe 8. The heavy weight vehicle member support unit 30b extends from the tip end portion of the sensor mounting unit 30a. The heavy weight vehicle member support unit 30b supports the heavy weight vehicle members 21 to 24 at a tip end portion thereof. The base end portion of the sensor mounting unit 30a is the base end portion of the support member 30. The tip end portion of the heavy weight vehicle member support unit 30b is the tip end portion of the support member 30. The base end portion of the support member 30 is a fastened end portion fastened to the head pipe 8, while the tip end portion of the support member 30, supporting the vehicle members, is a free end portion. In this way, the support member 30 has a structure like a cantilever.

The sensor mounting unit 30a includes a pair of right and left mounting plate sections 32, 31, and a coupling plate section 33 coupling the pair of right and left mounting plate sections 32, 31 to each other in the vehicle width direction. The mounting plate sections 31, 32 are plates extending vertically and in the forward and rearward direction. Portions in the forward and rearward direction, of the mounting plate sections 31, 32 which are between the gyro sensor 40 and the fastening section 8b of the head pipe 8, are bent in the vehicle width direction. In the present embodiment, each of the mounting plate sections 31, 32 has a portion bent in the vehicle width direction, and a portion bent in the forward and rearward direction, in front of the tip (front) end portion of the fastening section 8b of the head pipe 8. In this structure, each of the mounting plate sections 31, 32 has a stepped portion.

Each of the mounting plate sections 31, 32 is offset in the vehicle width direction with respect to a vehicle body center line L extending in the forward and rearward direction. In the present embodiment, the mounting plate sections 31, 32 are symmetric with respect to the vehicle body center line L in the rightward and leftward direction. Portions of the mounting plate sections 31, 32 which are in front of their centers in the forward and rearward direction, are bent in a vertical direction (in the present embodiment, in an upward direction). The rear end portion of each of the mounting plate sections 31, 32 is fastened to the fastening section 8b of the head pipe 8 in the vehicle width direction by use of a first fastener member 51 (a bolt 51a and a nut 51b). The coupling plate section 33 is a plate member extending in the forward and rearward direction and in the rightward and leftward direction. The coupling plate section 33 is joined to the lower end portions of the mounting plate sections 31, 32 by welding.

The gyro sensor 40 is mounted on the left mounting plate section 31, of the pair of right and left mounting plate sections 32, 31. The mounting plate sections 31, 32 are disposed between the head lamp unit 21 and the head pipe 8. Therefore, the gyro sensor 40 is mounted on a portion of the support member 30 which is located between the head lamp unit 21 and the head pipe 8. The gyro sensor 40 mounted on the left mounting plate section 31 overlaps with the head pipe 8 in the forward and rearward direction (when viewed from the forward and rearward direction). Alternatively, the gyro sensor 40 may be mounted on the right mounting plate 32. Further, the gyro sensors 40 which detect different vehicle body behaviors may be mounted on pair of right and left mounting plate sections 32, 31, respectively. The gyro sensor 40 is mounted on the left mounting plate section 31 at a location that is in front of the center in the forward and rearward direction, of the mounting plate section 31.

The gyro sensor 40 is mounted on the surface (in the present embodiment, a left side surface 31a of the mounting plate section 31) of the support member 30, the surface being perpendicular to the vehicle width direction. In other words, the left side surface 31a of the mounting plate section 31 is a sensor mounting surface on which the gyro sensor 40 is mounted. The normal line of the sensor mounting surface 31a is oriented in the vehicle width direction.

The gyro sensor 40 is mounted on the sensor mounting surface 31a in the vehicle width direction, by use of second fastener members 52 (bolts 52a and nuts 52b). The fastening direction of the second fastener members 52 is the same as that of the first fastener members 51. The gyro sensor 40 is mounted on the left mounting plate section 31 via elastic members (e.g., rubber bushes) 41, 42. In this way, the gyro sensor 40 is mounted on the mounting plate section 31 via rubber mounts. Between the elastic members 42 and the nuts 52b, a flat plate 43 made of a metal and extending in the forward and rearward direction is interposed to face the mounting plate section 31 in the vehicle width direction. The flat plate 43 functions as a washer which prevents the nuts 52b from loosening. Alternatively, the flat plate 43 may be omitted.

Figure 5:
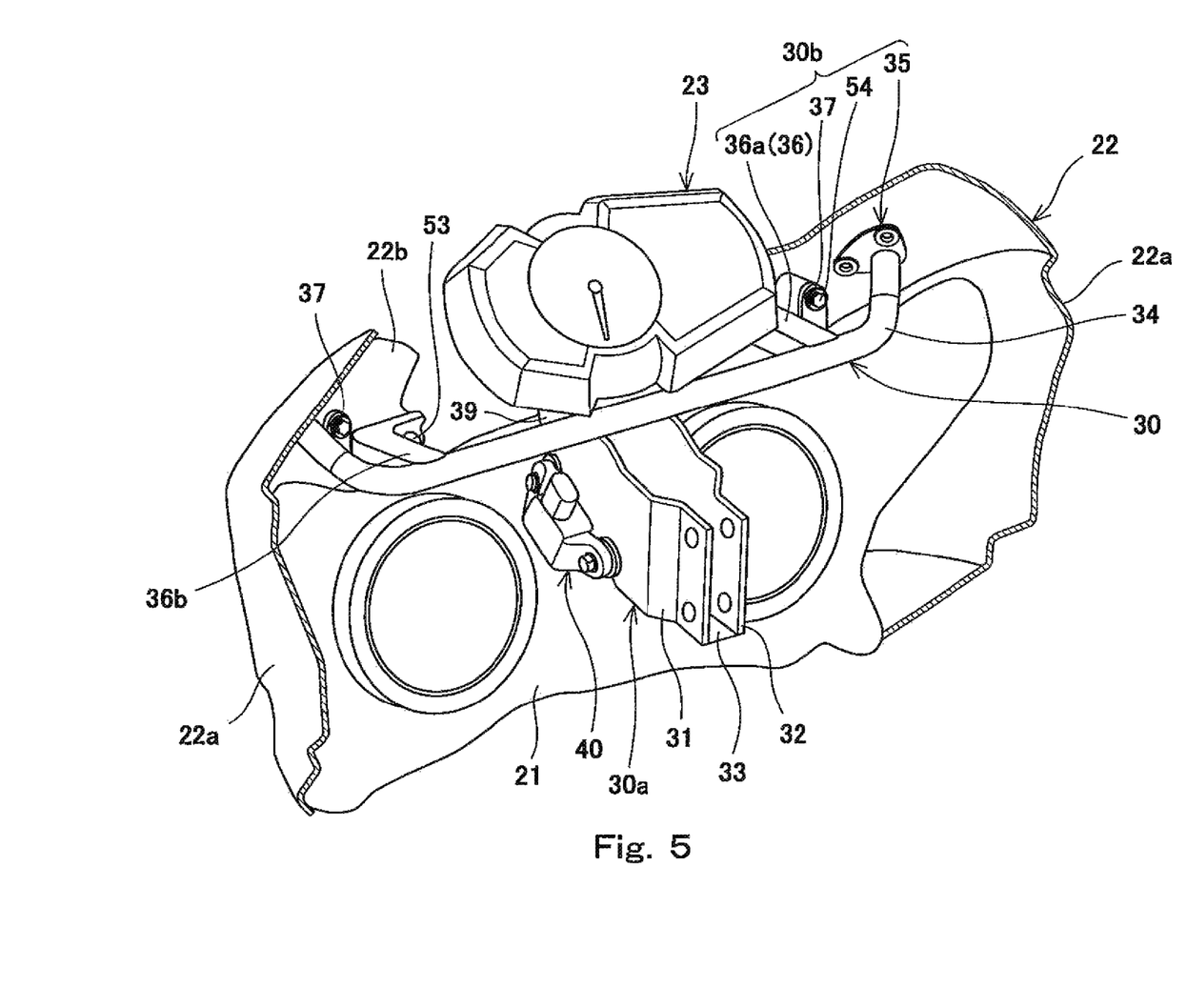
FIG. 5 is a perspective view showing a region which is in the vicinity of the support member of FIG. 3, when viewed obliquely from the left and the rear, in a state in which a front cowling and a meter device are mounted on the support member.

FIG. 5 is a perspective view showing a region which is in the vicinity of the support member 30 of FIG. 3, when viewed obliquely from the left and the rear, in a state in which the front cowling 22 and the meter device 23 are mounted on the support member 30. In the example of FIG. 5, the head pipe 8 is not shown. As shown in FIGS. 2 to 5, the heavy weight vehicle member support unit 30b includes a pair of mirror support sections 35 which support the pair of side mirrors 24 (see FIG. 1), a head lamp support section 36 which supports the head lamp unit 21, a pair of cowling support sections 37 which support the front cowling 22, and a meter support section 38 which supports the meter device 23.

The pair of mirror support sections 35 extend from the tip end portions of the pair of right and left mounting plate sections 32, 31, respectively, via a pipe section 34. The pipe section 34 extends in the rightward and leftward direction on the upper surfaces of the tip end portions of the mounting plate sections 31, 32, and the right and left end portions of the pipe section 34 are bent in an upward direction. In the present embodiment, the pipe section 34 is joined to the mounting plate sections 31, 32 by welding. The mirror support sections 35 have a substantially disc shape, and are provided on the right and left ends of the pipe section 34. When viewed from the side, the mirror support sections 35 and the pipe section 34 overlap with the gyro sensor 40 in vehicle width direction.

Each of the mirror support sections 35 is formed with a plurality of first insertion holes 35a and a second insertion hole 35b. Fastener members (e.g., bolts) are inserted into the plurality of first insertion holes 35a, respectively, to fasten the side mirror 24 to the mirror support section 35. A fastener member (e.g., bolt) is inserted into the second insertion hole 35b to fasten the front cowling 22 to the mirror support section 35. Specifically, the upper portions of a pair of right and left side walls 22a of the front cowling 22 are fastened to the mirror support sections 35, respectively. In this way, the mirror support sections 35 also function as cowling support sections which support the front cowling 22.

The head lamp support section 36 includes a pair of right and left first head lamp support sections 36a, 36b integrated with the pipe section 34, and a second head lamp support section 36c disposed between the first head lamp support sections 36a, 36b. The first head lamp support sections 36a, 36b are symmetric in the rightward and leftward direction with respect to the vehicle body center line L. Each of the first head lamp support sections 36a, 36b is formed by partially bending a plate member extending in the forward and rearward direction, in an inward direction of the vehicle width direction. The first head lamp support sections 36a, 36b extend from portions of the pipe section 34 which are inward in the vehicle width direction, relative to the mirror support sections 35, respectively.

The second head lamp support section 36c extends downward from the lower ends of the tip end portions of the mounting plate sections 31, 32. In the present embodiment, the second head lamp support section 36c is formed by partially bending a plate member extending vertically. The second head lamp support section 36c is joined to the tip end portions of the mounting plate sections 31, 32 by welding. A rear wall 21a of the head lamp unit 21 is fastened to the first head lamp support sections 36a, 36b, and the second head lamp support section 36c, by use of fastener members (e.g., bolts and nuts) 53.

The cowling support sections 37 are disposed in front of the pipe section 34, and overlap with the mirror support sections 35 and the first head lamp support sections 36a, 36b, in the vehicle width direction when viewed from the side. Each of the cowling support sections 37 is formed by partially bending a plate member extending in the forward and rearward direction, in an outward direction of the vehicle width direction. The cowling support sections 37 are joined to the first head lamp support sections 36a, 36b, respectively, by welding. A front wall 22b of the front cowling 22 is fastened to the cowling support sections 37 in the forward and rearward direction by use of fastener members (e.g., bolts) 54. The front cowling 22 covers the side portions of the head lamp unit 21 at a location that is in front of the head pipe 8, and thereby covers the front portion of the vehicle body 11 (see FIG. 1). The gyro sensor 40 is disposed inside the front cowling 22.

The meter support section 38 includes a pair of right and left support plate sections 38a, 38b, and a coupling plate section 38c coupling the pair of right and left support plate sections 38a, 38b to each other in the vehicle width direction. When viewed from above (in a plan view), the right and left support plate sections 38a, 38b extend from the tip end portions of the mounting plate sections 32, 31, respectively, to be bent outward in the rightward and leftward direction, and then extend forward. In the present embodiment, the support plate sections 38a, 38b are integrated with the mounting plate sections 32, 31, respectively. The coupling plate section 38c is joined to the lower surfaces of the support plate sections 38a, 38b, by welding. The meter device 23 is fastened to the support plate sections 38a, 38b via link members (not shown).

The motorcycle 1 configured as described above can obtain the following advantages.

The gyro sensor 40 is mounted on the support member 30 supporting the head lamp unit 21. As described above, the support member 30 has a structure like the cantilever, which supports the vehicle members at the tip end portion thereof. It is known that the character frequency (natural frequency) of the cantilever is inversely proportional to the one-half power of a sum of the weight of the cantilever and the masses of the vehicle members. In the present embodiment, since the support member 30 supports the head lamp unit 21 which is one of the heavy weight vehicle members, among the vehicle members of the motorcycle 1, the character frequency of the support member 30 is low (has a small value). This makes it possible to prevent the support member 30 from vibrating at a high frequency wave. Since a vibration of a high frequency wave is not transmitted to the gyro sensor 40, the gyro sensor 40 does not vibrate at a high frequency wave. As a result, the accuracy of the detection signal output from the gyro sensor 40 can be improved.

Since the gyro sensor 40 is mounted on the support member 30 which is the existing member included in the motorcycle 1 to support the head lamp unit 21, the gyro sensor 40 can be mounted on the vehicle body 11 without increasing the number of members. Since the gyro sensor 40 is mounted on a portion of the support member 30 which is between the head lamp unit 21 and the head pipe 8, the length of the support member 30 in the forward and rearward direction is not increased, and the size of the support member 30 is not increased, in the configuration for mounting the gyro sensor 40.

The support member 30 supporting the head lamp unit 21 is not detached from the vehicle body 11 during a maintenance operation performed regularly. Therefore, the gyro sensor 40 is not easily accessible to a third party. This makes it possible to prevent the gyro sensor 40 from being undesirably detached from the vehicle body 11 by the third party.

The support member 30 supports the front cowling 22, the meter device 23, and the side mirrors 24 which are the heavy weight vehicle members, in addition to the head lamp unit 21. For this reason, the total mass of the vehicle members to be supported by the support member 30 is increased. Therefore, the character frequency of the support member 30 is lower (has a smaller value). This makes it possible to more effectively suppress the support member 30 and hence the gyro sensor 40 from vibrating at a high frequency wave. As a result, the accuracy of the detection signal output from the gyro sensor 40 can be further improved.

The support member 30 on which the gyro sensor 40 is mounted supports the meter device 23 which is the existing member included in the motorcycle 1. In this configuration, meter harness connected to the meter device 23 and the sensor harness 44 connected to the gyro sensor 40 are disposed to be close to each other, and the sensor harness 44 and the meter harness positioned in a predetermined manner can be easily laid out compactly as a bundle.

Since the gyro sensor 40 overlaps with the head pipe 8 in the forward and rearward direction, the gyro sensor 40 can be disposed at a location that is in the vicinity of the vehicle body center line L extending through the head pipe 8 and in the forward and rearward direction, namely, near the center of the vehicle body 11 in the vehicle width direction. In this layout, even in a case where the motorcycle 1 is turning in a state in which the vehicle body 11 is banked to one side in the vehicle width direction, the gyro sensor 40 can obtain a detection signal which is close to a signal indicating a vehicle body behavior at a center location of the vehicle body 11 in the vehicle width direction. As a result, the accuracy of the detection signal output from the gyro sensor 40 can be easily improved.

Since the gyro sensor 40 is disposed inside the front cowling 22, it becomes possible to prevent a situation in which the gyro sensor 40 is exposed to water flying from the front and the sides of the vehicle body 11.

The gyro sensor 40 is mounted on the surface (left side surface of the left mounting plate section 31) 31*a* of the support member 30, the surface being perpendicular to the vehicle width direction. In this configuration, the gyro sensor 40 is less affected by a vibration in the direction perpendicular to the vehicle width direction, which tends to be generated in the motorcycle 1 including the inline multi-cylinder engine E. This makes it possible to improve the accuracy of the detection signal output from the gyro sensor 40, while reducing the effects of vibrations on the gyro sensor 40.

A portion of the mounting plate section 31 on which the gyro sensor 40 is mounted, the portion being in the forward and rearward direction, is bent in the vehicle width direction. This allows the mounting plate section 31 to secure a vertical strength. Therefore, the mounting plate section 31 is less affected by a vertical vibration which tends to be generated in the motorcycle 1 including the inline multi-cylinder engine E. This makes it possible to further improve the accuracy of the detection signal output from the gyro sensor 40.

In a case where the motorcycle 1 is traveling on an uneven (bumpy) road surface, a vertical vibration is generated more easily in the motorcycle 1 than in a four-wheeled vehicle which travels on similar traveling conditions. This is because the suspended weight of the motorcycle 1 is smaller than that of the four-wheeled vehicle. The center of gravity of the vehicle body 11 of the motorcycle 1 is higher than that of the four-wheeled vehicle which travels on similar traveling conditions, and the wheel base of the motorcycle 1 is shorter than that of the four-wheeled vehicle. For this reason, while the motorcycle 1 is accelerated or decelerated by the rider's operation of the handle 6, a vibration in the forward and rearward direction is more easily generated in the motorcycle 1 than in the four-wheeled vehicle. In the configuration of the present embodiment, since the gyro sensor 40 is mounted on the surface perpendicular to the vehicle width direction, of the mounting plate section 31, it becomes possible to reduce the effects of the vertical vibration on the gyro sensor 40 in a case where the motorcycle 1 is traveling on the uneven (bumpy) road surface, and the effects of the vibration in the forward and rearward direction on the gyro sensor 40, which is caused by acceleration or deceleration of the motorcycle 1, and further improve the accuracy of the detection signal output from the gyro sensor 40.

Since the pair of mounting plate sections 31, 32 are coupled to each other in the vehicle width direction by the coupling plate section 33, the strength of the support member 30 in the vehicle width direction can be secured, and the gyro sensor 40 is less affected by the vibration in the vehicle width direction. Therefore, the effects of the vibration in the vehicle width direction on the gyro sensor 40 can be reduced, and the accuracy of the detection signal output from the gyro sensor 40 can be further improved.

Since the gyro sensor 40 is mounted on the support member 30 in the vehicle width direction, the gyro sensor 40 can be easily mounted in a manufacture line of the motorcycle 1. Since the fastening direction of the second fastener members 52 used to mount the gyro sensor 40 on the support member 30 is the same as that of the first fastener members 51 used to fasten the support member 30 to the head pipe 8, mounting of the gyro sensor 40 and fastening of the support member 30 can be carried out in the same direction, and the gyro sensor 40 can be easily mounted on the support member 30. Since the gyro sensor 40 can be easily mounted on the support member 30, accuracy with which the gyro sensor 40 is mounted on the support member 30 can be improved.

Since the pair of mounting plate sections 31, 32 of the support member 30 are fastened to the fastening section 8*b* of the head pipe 8, the support member 30 can be fastened to the head pipe 8 while minimizing the number of members between the support member 30 and the head pipe 8. This makes it possible to prevent a situation in which the frequency of a vibration which is transmitted to the gyro sensor 40 is changed to become higher. Therefore, it becomes possible to more effectively prevent the gyro sensor 40 from vibrating at a high frequency wave, and further improve the accuracy of the detection signal output from the gyro sensor 40.

The base end portion of the sensor mounting unit 30*a* is fastened to the head pipe 8, and the heavy weight vehicle member support sections 35 to 38 extend from the tip end portion of the sensor mounting unit 30*a*. In this configuration, the support member 30 may be deflected by loads applied by the heavy weight vehicle members 21 to 24. However, the gyro sensor 40 can be mounted on the support member 30 at a location that is closer to the head pipe 8 of the vehicle body frame 4, rather than the locations of the heavy weight vehicle member support sections 35 to 38. This makes it possible to prevent a situation in which a vibration caused by the deflection is transmitted to the gyro sensor 40. Therefore, the accuracy of the detection signal output from the gyro sensor 40 can be improved.

The sensor harness 44 connected to the connector connection section 40*c* of the gyro sensor 40 extends obliquely in the upward direction. This configuration makes it possible to prevent interference between the sensor harness 44 and the members such as the pipe section 34 and the mirror support sections 35 of the support member 30, which overlap with the gyro sensor 40 in the vehicle width direction when viewed from the side. In addition, the connector 44*a* of the sensor harness 44 can be easily connected to the connector connection section 40*c* of the gyro sensor 40, from above.

Embodiment 2

A motorcycle 201 according to Embodiment 2 is different from the motorcycle 1 according to Embodiment 1 in the mounting location of the gyro sensor 40. Hereinafter, regarding the mounting location of the gyro sensor 40 according to Embodiment 2, differences from Embodiment 1 will be described.

Figure 6:
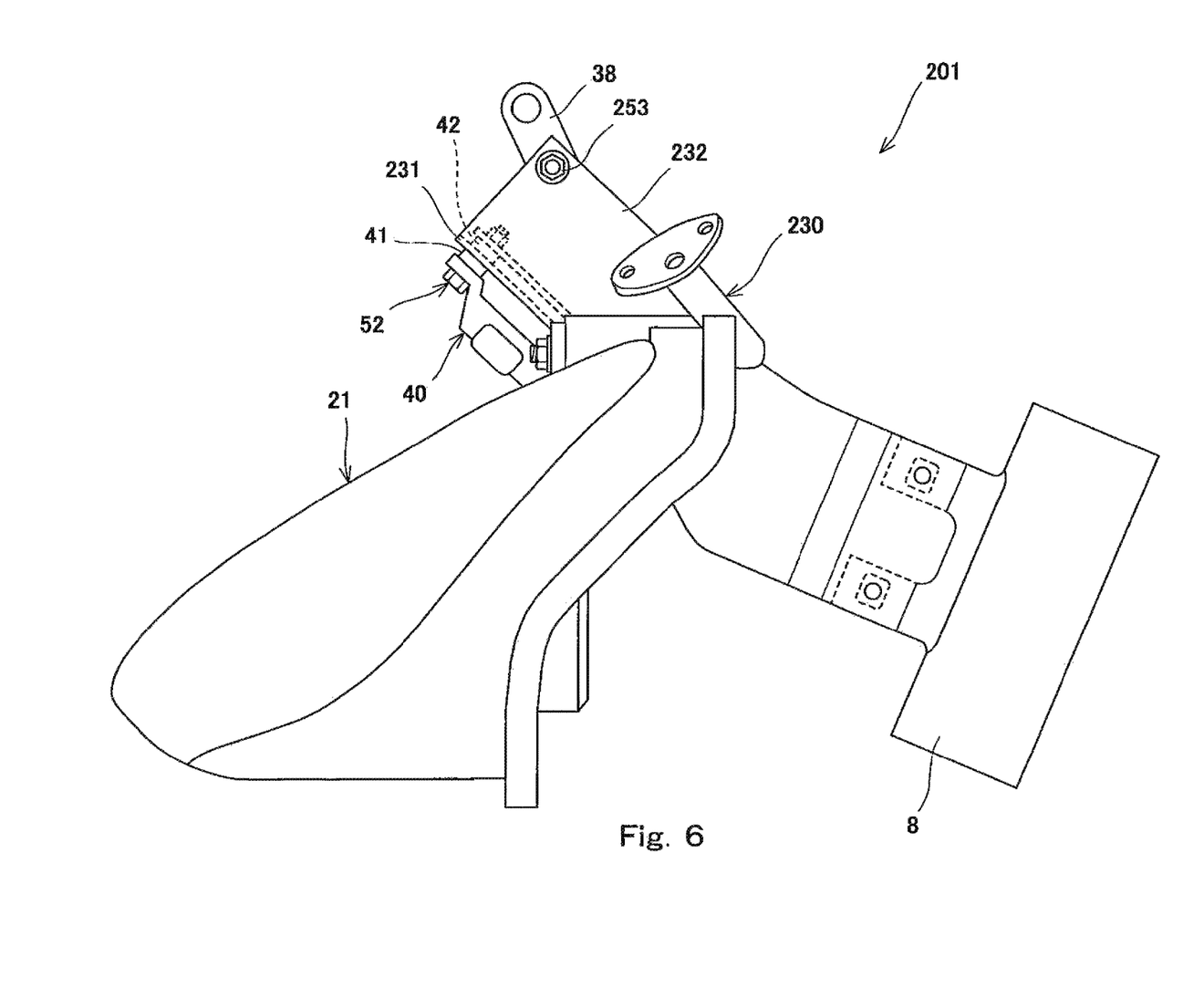
FIG. 6 is a side view showing a region which is in the vicinity of the support member supporting the head lamp unit, when viewed from the left in the vehicle width direction, in a motorcycle which is an example of a straddle-type vehicle according to Embodiment 2.

FIG. 6 is a side view showing a region which is in the vicinity of a support member 230 supporting the head lamp unit 21, when viewed from the left in the vehicle width direction. Referring to FIG. 6, a mounting plate section 231 on which the gyro sensor 40 is mounted is disposed in front of and below the meter support section 38. The mounting plate section 231 is a plate member extending in the forward and rearward direction and in the rightward and leftward direction. The gyro sensor 40 is mounted on the surface of the mounting plate section 231 of the support member 230, the surface being parallel to the vehicle width direction.

As described above, the mounting plate section 231 on which the gyro sensor 40 is mounted is disposed in front of and below the meter support section 38. The mounting plate section 231 is coupled to the meter support section 38 via coupling plate sections 232 provided on the right and left sides of the mounting plate section 231. The coupling plate sections 232 are plate members extending in the forward and rearward direction and in the vertical direction. The lower end portions of the coupling plate sections 232 are joined to the right and left end portions of the mounting plate section 231, respectively, by welding. The upper end portions of the coupling plate sections 232 are fastened to the meter support section 38 by use of fastener members 253 such as bolts and nuts. In other respects, the configuration of Embodiment 2 is the same as that of Embodiment 1.

In accordance with the above-described configuration, since the support member 230 on which the gyro sensor 40 is mounted supports the heavy weight vehicle members such as the head lamp unit 21, it becomes possible to prevent the support member 230 from vibrating at a high frequency wave, as in the configuration of Embodiment 1. This makes it possible to prevent the gyro sensor 40 mounted on the support member 230 from vibrating at a high frequency wave, and improve the accuracy of the detection signal output from the gyro sensor 40. In addition, since the meter support section 38 and the meter device 23 are disposed above the gyro sensor 40, the gyro sensor 40 is less likely to be exposed to rain water or the like from above.

Embodiment 3

A motorcycle 301 according to Embodiment 3 is different from the motorcycle 1 according to Embodiment 1 in the mounting location of the gyro sensor 40. Hereinafter, regarding the mounting location of the gyro sensor 40 according to Embodiment 3, differences from Embodiment 1 will be described.

Figure 7:
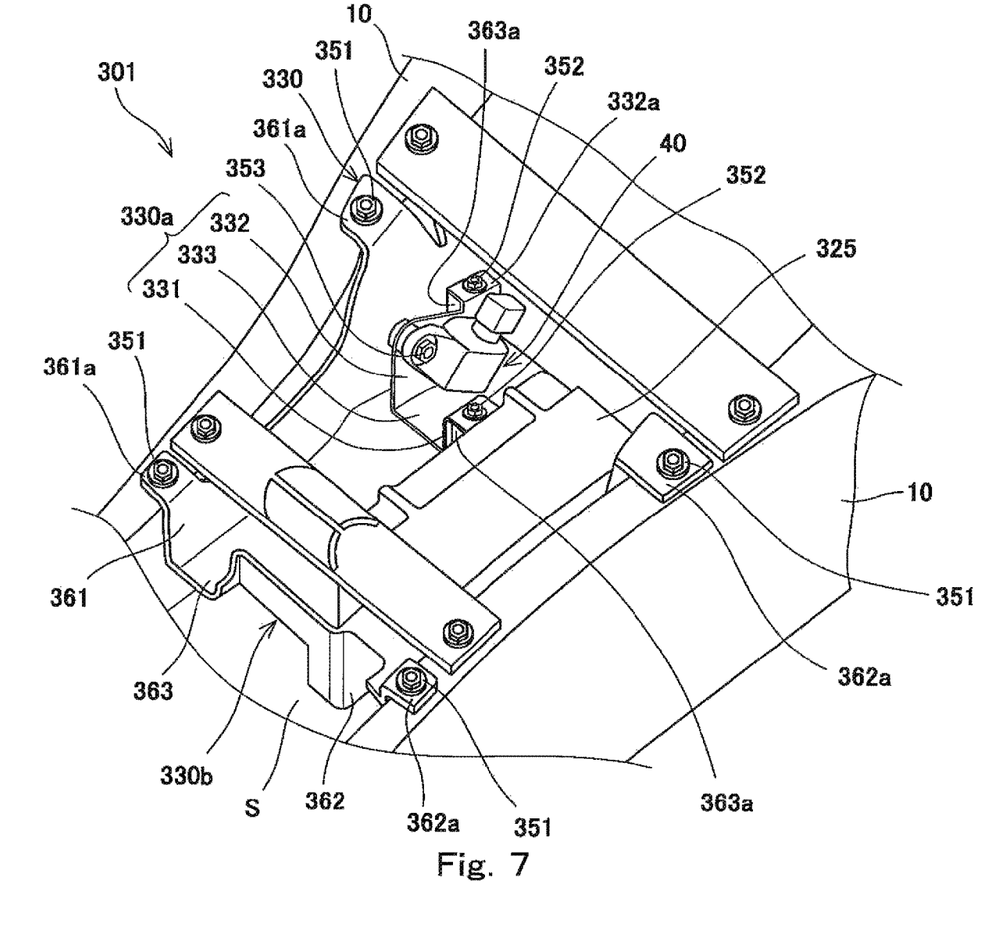
FIG. 7 is a perspective view showing a region which is in the vicinity of the support member supporting a battery, when viewed obliquely from the left and above, in a motorcycle which is an example of a straddle-type vehicle according to Embodiment 3.

FIG. 7 is a perspective view showing a region which is in the vicinity of a support member 330 supporting a battery 325, when viewed obliquely from the left and above, in the motorcycle 301 according to Embodiment 3. Referring to FIG. 7, the support member 330 is disposed in a space S formed between the pair of right and left rear frames 10, at a location that is below the seat 12 (see FIG. 1). In the present embodiment, the support member 330 supports the battery 325 which is one of the heavy weight vehicle members. The battery 325 has a box shape. The battery 325 is configured to store therein electric power to operate electric devices, for example, electric power required to start the engine E.

The support member 330 includes a battery support unit 330b supporting the battery 325. The battery support unit 330b includes a pair of right and left side plate sections 361, 362 extending in the forward and rearward direction and in the vertical direction, and a bottom plate section 363 coupling the lower end portions of the pair of right and left side plate sections 361, 362 to each other in the vehicle width direction. In this structure, the battery support unit 330b has a hollow space which opens in an upward direction and in which the battery 325 is accommodated. The side plate section 361 is provided with flange sections 361a protruding outward in the vehicle width direction, from the upper portions of the both end portions in the forward and rearward direction, of the side plate section 361. The side plate section 362 is provided with flange sections 362a protruding outward in the vehicle width direction, from the upper portions of the both end portions in the forward and rearward direction, of the side plate section 362. The flange sections 361a, 362a are fastened to the rear frames 10, in the vertical direction, by use of, for example, fastener members 351 such as bolts.

The bottom plate section 363 includes a plurality of bosses 363a protruding upward from the upper surface of the bottom plate section 363. Each of the bosses 363a is formed with a thread formed on an inner surface thereof. A fastener member (e.g., bolt) 352 is inserted into each of the bosses 363a through the thread to fasten a sensor mounting unit 330a to the boss 363a. The sensor mounting unit 330a includes mounting plate sections 331, 332. From the upper end portions of the mounting plate sections 331, 332 of the sensor mounting unit 330a, flanges 331a, 332a are provided to protrude outward in the rightward and leftward direction. The flanges 331a, 332a are fastened to the bosses 363a, respectively. The right mounting plate section 332 of the sensor mounting unit 330a, on which the gyro sensor 40 is mounted, is fastened to the side plate section 361 of the battery support unit 330b by use of, for example a fastener member 353 such as a bolt. In other respects, the configuration of Embodiment 3 is the same as that of Embodiment 1.

In accordance with the above-described configuration, since the support member 330 on which the gyro sensor 40 is mounted supports the heavy weight vehicle member such as the battery 325, it becomes possible to prevent the support member 330 from vibrating at a high frequency wave, as in the configuration of Embodiment 1. This makes it possible to prevent the gyro sensor 40 mounted on the support member 330 from vibrating at a high frequency wave, and improve the accuracy of the detection signal output from the gyro sensor 40.

In addition, the gyro sensor 40 is mounted on the support member 330 supporting the battery 325 disposed in the space formed below the seat 12, at a location that is near the battery 325 positioned to be less likely to be exposed to water. Accordingly, the gyro sensor 40 is also less likely to be exposed to water. Further, typically, the support member 330 supporting the battery 325 is not detached from the vehicle body 11 during a maintenance operation performed regularly. Therefore, the gyro sensor 40 is not easily accessible to a third party. This makes it possible to prevent the gyro sensor 40 from being undesirably detached from the vehicle body 11 by the third party.

The present invention is not limited to the above-described embodiments. The above-described configurations may be changed, added to or deleted from, within a scope of the spirit of the preset invention. The above-described embodiments may be combined. For example, a part of the configuration of one embodiment may be applied to the other embodiments. Also, a part of the configuration of one embodiment may be separated from the configuration of this embodiment and extracted. The support member 30 on which the gyro sensor 40 is mounted may support other heavy weight vehicle members as well as the above-described heavy weight vehicle members. For example, the heavy weight vehicle member may be an evaporator unit which regulates the amount of fuel evaporated from the fuel tank.

Further, the vehicle body behavior sensor 40 may detect as the physical motion, a n-times temporal differentiation (n: natural number) of a positional change in an axial direction of at least one of the three axes which are the roll axis of the vehicle body 11, the yawing axis of the vehicle body 11, and the pitching axis of the vehicle body 11. The vehicle body behavior sensor 40 may detect a position in the axial direction of at least one of the three axes which are the roll axis of the vehicle body 11, the yawing axis of the vehicle body 11, and the pitching axis of the vehicle body 11, or an angle around at least one of the three axes. The vehicle body behavior sensor 40 may detect an external force applied to a sensor mounting location. For example, the vehicle body behavior sensor 40 may detect as the external force a force containing one of a gravitational force component, an inertia force component, and a centrifugal force component. Moreover, the straddle-type vehicle is not limited to the motorcycle 1, and may be, for example, an all-terrain vehicle (ATV).

The invention claimed is:

1. A straddle-type vehicle comprising:
a vehicle body frame;
a heavy weight vehicle member mounted on a vehicle body;
a support member fastened to the vehicle body frame to support the heavy weight vehicle member;
a vehicle body behavior sensor which detects a behavior of the vehicle body; and
a front cowling covering a front portion of the vehicle body,
wherein the vehicle body behavior sensor is mounted on the support member, and
wherein the support member supports the front cowling.

2. The straddle-type vehicle according to claim 1,
wherein the heavy weight vehicle member is a head lamp unit disposed in front of a head pipe of the vehicle body frame,
wherein the support member is fastened to the head pipe to support the head lamp unit, and
wherein the vehicle body behavior sensor is mounted on a portion of the support member which is between the head lamp unit and the head pipe.

3. The straddle-type vehicle according to claim 1, further comprising:
a meter device disposed in front of a head pipe,
wherein the support member supports the meter device.

4. The straddle-type vehicle according to claim 1, further comprising:
a first fastener member used to fasten the support member to the vehicle body frame; and
a second fastener member used to mount the vehicle body behavior sensor on the support member,
wherein a fastening direction of the second fastener member is the same as a fastening direction of the first fastener member, and
wherein the fastening direction of the first fastener member and the fastening direction of the second fastener member conform to a vehicle width direction.

5. The straddle-type vehicle according to claim 1, further comprising:
an engine including a crankshaft extending in a vehicle width direction,
wherein the vehicle body behavior sensor is mounted on a surface of the support member, the surface being perpendicular to the vehicle width direction.

6. The straddle-type vehicle according to claim 1,
wherein the support member includes a pair of mounting plate sections, and a coupling plate section coupling the pair of mounting plate sections to each other in a vehicle width direction, and
wherein the vehicle body behavior sensor is mounted on at least one of the pair of mounting plate sections.

7. A straddle-type vehicle comprising:
a vehicle body frame;
a heavy weight vehicle member mounted on a vehicle body;
a support member fastened to the vehicle body frame to support the heavy weight vehicle member; and
a vehicle body behavior sensor which detects a behavior of the vehicle body,
wherein the vehicle body behavior sensor is mounted on the support member,
wherein the heavy weight vehicle member is a head lamp unit disposed in front of a head pipe of the vehicle body frame,
wherein the support member is fastened to the head pipe to support the head lamp unit,
wherein the vehicle body behavior sensor is mounted on a portion of the support member which is between the head lamp unit and the head pipe, and
wherein the vehicle body behavior sensor overlaps with the head pipe in a forward and rearward direction of the vehicle body.

8. A straddle-type vehicle comprising:
a vehicle body frame;
a heavy weight vehicle member mounted on a vehicle body;
a support member fastened to the vehicle body frame to support the heavy weight vehicle member; and
a vehicle body behavior sensor which detects a behavior of the vehicle body,
wherein the vehicle body behavior sensor is mounted on the support member,
wherein the vehicle body frame includes a front frame and a rear frame extending rearward from a rear end of the front frame,
wherein the rear frame supports a seat which is straddled by a rider,
wherein the heavy weight vehicle member is a battery disposed in a space formed below the seat, and
wherein the support member is fastened to the rear frame to support the battery.

* * * * *